UNITED STATES PATENT OFFICE.

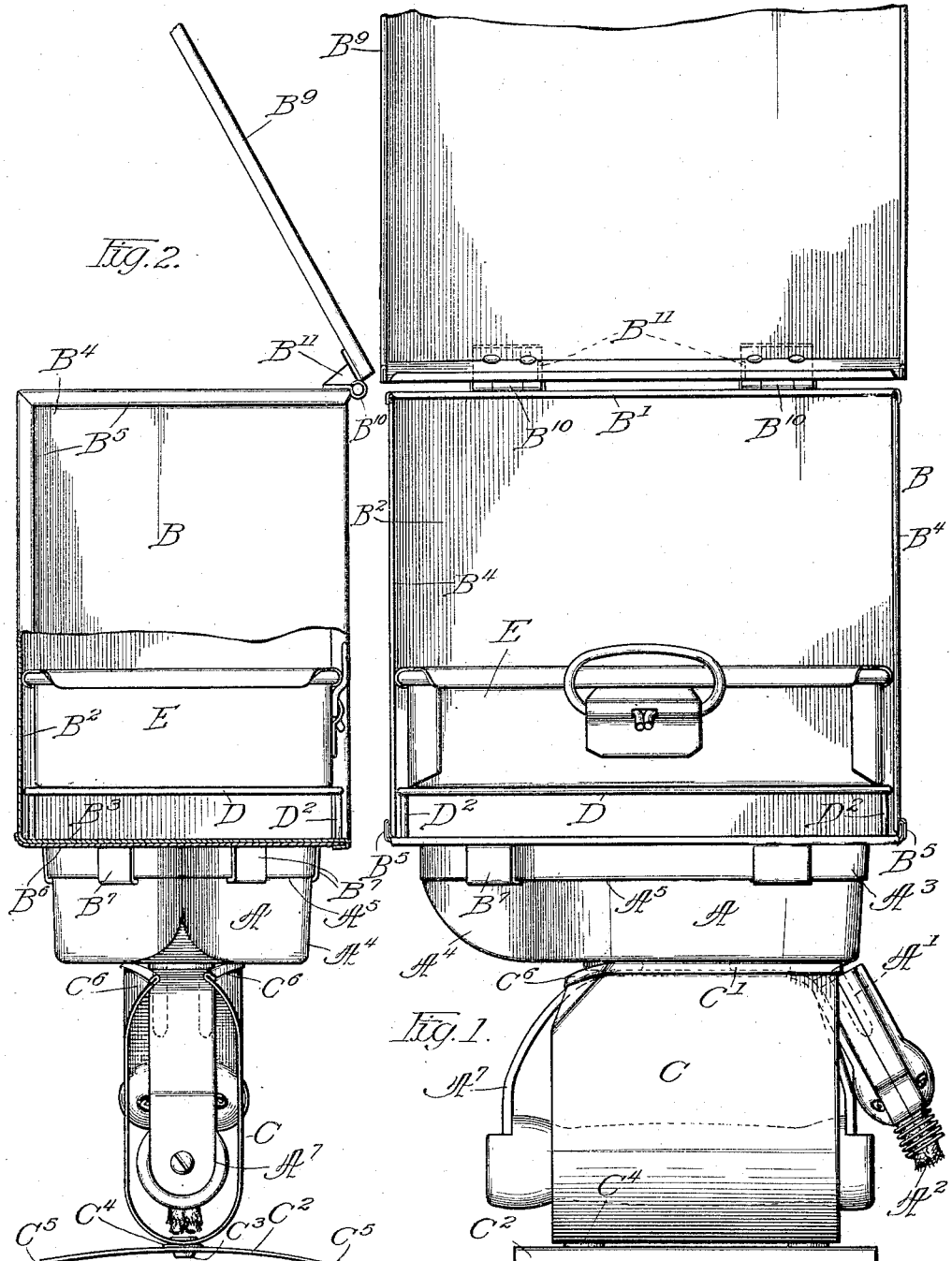

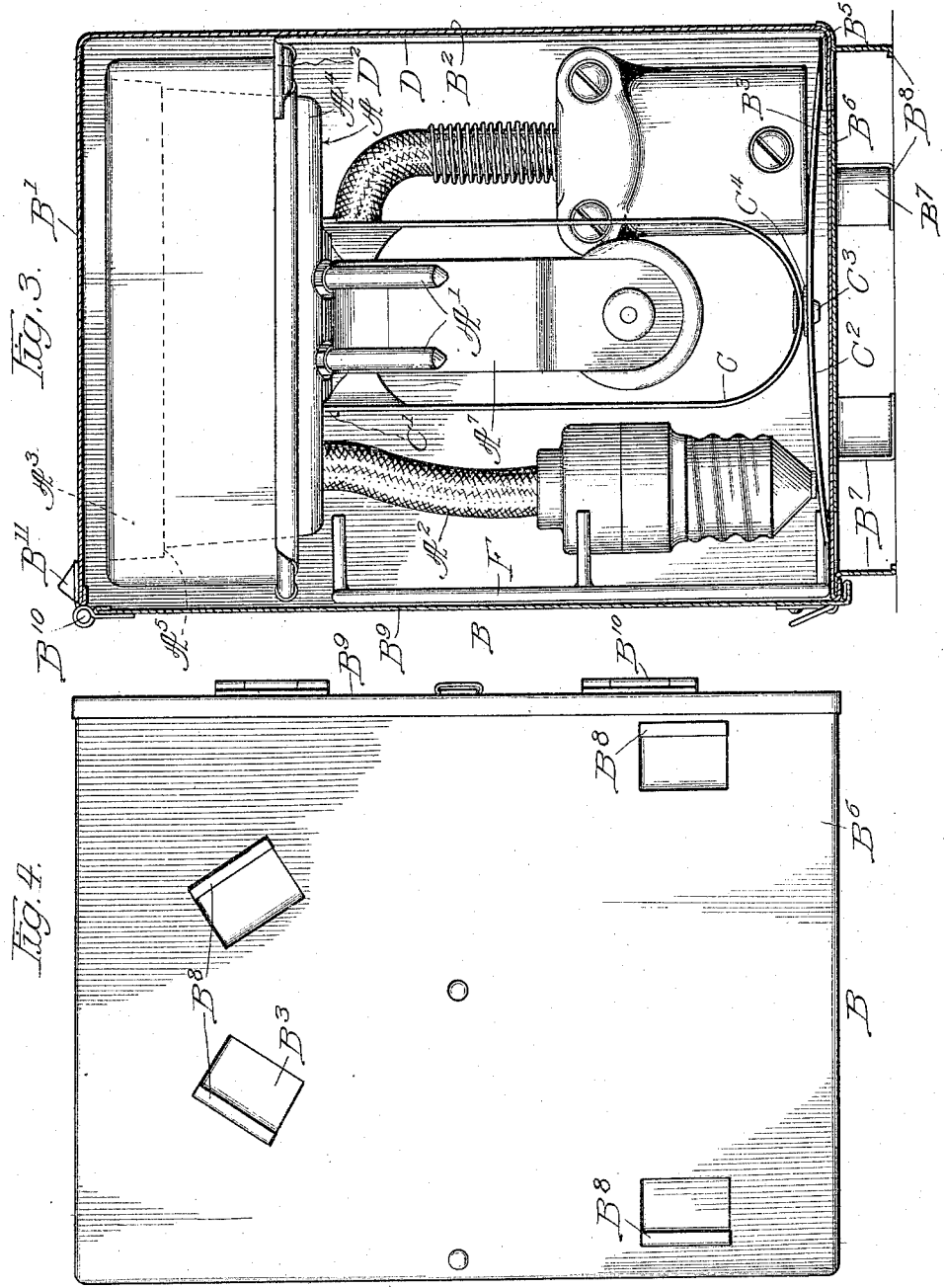

JEREMIAH B. McLENE, OF CHICAGO, ILLINOIS.

COMBINATION SAD-IRON AND HEATING UTENSIL.

1,226,230.  Specification of Letters Patent.  Patented May 15, 1917.

Application filed December 22, 1916. Serial No. 138,334.

*To all whom it may concern:*

Be it known that I, JEREMIAH B. MCLENE, a citizen of the United States of America, and resident of Chicago, Cook county, Illinois, have invented a certain new and useful Improvement in Combination Sad-Irons and Heating Utensils, of which the following is a specification.

My invention relates to that general class of heating and cooking utensils which involve a sad iron, electrically heated, capable of performing its usual function and of being inverted to serve as a heating element for a cooking utensil, and one of the objects of my invention is to provide an improved device of this character which will be simple, durable and reliable in construction, effective and efficient in operation, inexpensive to manufacture, and compact in its arrangement of parts.

Other objects of my invention will appear hereinafter.

My invention consists in the features of novelty exemplified by the construction, combination and arrangement of parts hereinafter described, shown in the accompanying drawings, and more particularly pointed out in the appended claims.

Referring to the accompanying drawings—

Figure 1 is a view in side elevation of my improved device in an assembled condition ready for use.

Fig. 2 is a view of the structure shown in Fig. 1, the oven or receptacle being shown for illustrative purposes.

Fig. 3 is a sectional view of the oven illustrating the manner in which the heater and all other parts are compactly nested.

Fig. 4 is a bottom plan view of the oven showing the manner in which the oven is interlocked with the heater.

The heating element which I have shown in the drawings in this instance is a sad iron A which may be of any suitable type, but is preferably of the electrically heated type, having terminals $A^1$ and conductors $A^2$ for connection with a source of electric current. This sad iron has a handle or grip $A^7$ by which it is manipulated when used to perform the usual functions of a sad iron. It also has a bottom hot plate $A^3$ supported by the body portion $A^4$ and this bottom plate, in the usual types of irons, extends beyond the body at the edge and forms a continuous flange or rim $A^5$. When the iron is used as a heating element for cooking purposes, it is adapted to be upturned or inverted, and in that position to support upon its bottom plate a receptacle or oven B. Therefore, in order to support the iron in its inverted position, I provide a holder C. This holder is preferably U-shaped in form and is adapted to support the iron with the handle between its sides. Its upper edges $C^1$ are beaded or turned over to make them substantial and rigid and to provide suitable supporting edges for the body of the iron. The forward corners $C^6$ are turned inwardly to form stops which limit the extent to which the iron may be inserted into the holder. The iron is thus supported on the edges throughout their entire length and cannot become displaced or disturbed. The ends of this holder are open and permit the free circulation of air which keeps the standard or holder in a cool condition. This holder has a base or supporting plate $C^2$, which is preferably fastened thereto by rivets $C^3$, and if desired the insulating washers or separators $C^4$ may be interposed between the base and U-portion to guard against the heat radiating to the base and thence to the surface upon which the device is placed. As a further precaution against damage to said surface, I curve the base plate so that it touches the supporting surface only along its two longitudinal edges $C^5$. The oven B is made rectangular in shape and is of just sufficient size to contain the iron and other attachments. It is preferably made of sheet metal of suitable thickness for the purpose. In the particular structure shown, the top wall $B^1$, rear wall $B^2$ and bottom wall $B^3$ are preferably made integral, and the end walls $B^4$ are made as separate plates which are joined to the other walls by the formation of beads or turned seams $B^5$ along their adjoining edges, these seams serving also as strengthening ribs which give rigidity to the structure. On the bottom wall of the oven, I provide a reinforcing plate or member $B^6$ which in this case is an additional piece of sheet metal. This reinforcing plate is adapted to lie in close contact with the bottom wall to prevent any air space therebetween, and it is secured in place by turning its edges into the seams $B^5$ along the bottom edges of the oven. When the iron is upturned and supported in its holder, the oven is placed upon its bottom hot plate, the reinforcing bottom $B^6$ of the oven resting in intimate contact with the surface of the iron, but in order to prevent its being accidentally displaced, I provide a series of catches or lugs B⁷ at intervals on the bottom of the oven. These lugs are preferably formed integral with the plate B⁶ by striking them up therefrom at substantially right angles. These lugs are formed substantially of a length equal to the thickness of the flange A⁵ on the particular type of sad iron employed, but their ends B⁸ are inturned to form catches which engage the inner side of the flange A⁵ and thus virtually interlocking the oven and sad iron. These lugs are disposed on a general line around the bottom of the oven conforming to the general contour of the bottom plate of the sad iron, and since the usual sad irons are generally tapered or gradually narrowed toward their forward ends, the oven may be removed or replaced by simply moving the oven and iron relatively in parallel planes. The front wall B⁹ of the oven constitutes a door therefor, and for this reason it is provided with suitable hinges B¹⁰ along its upper edge so that gravity normally tends to maintain the door closed. In addition to this, the door may have a suitable latch at its lower edge by which it may be locked closed. In the event that my cooking is to be done with the door open, the door may be swung upwardly past a vertical position and gravity will then hold it open. The hinges may have suitable stops B¹¹ for limiting the rearward swing of the door, if desired. For the purpose of toasting bread, or other character of cooking where the food is to be kept off of the bottom of the oven, I provide an open grate which in the present construction consists of a rectangular frame D having a series of spaced bars or rods extending lengthwise thereof, and having suitable legs D² which hold the grate up from the bottom of the oven the required distance. This grate is readily removable from the oven when not desired for use, but when the device is to be packed for the purpose of carrying it about, the grate may be placed in position against the rear wall of the oven, as shown in Fig. 3. I also provide a pan or tray E which is intended to be used when liquids are to be heated. This is rectangular in shape to conform to the shape of the oven, and is adapted to fit within the oven. This pan may be used upon the grate, if desired, or placed directly upon the bottom of the oven as it would be when the parts are nested together. However, I prefer when nesting the parts together in the oven that the pan or tray be inverted and placed over the bottom of the inverted iron, as shown in Fig. 3. It will thus be seen that I have provided a very compact portable structure capable, when the parts are in their positions, of performing numerous functions which are especially useful to travelers. The device is comparatively small and occupies but very little room and the parts can all be packed within the oven where they cannot become lost. In nesting or packing the parts, I prefer that the grate be first positioned against the rear wall of the oven. The iron is then upturned and placed in its holder, and the base plate of the holder placed directly upon the bottom of the oven. This assembled unit, so to speak, is then placed in the oven, the conductors being either wound around the holder or placed loosely in the space between the holder and the grate. I find it desirable to provide a stand or support F which may be of any suitable type usually employed in connection with the said iron when said iron is used for pressing or ironing purposes. This stand is arranged to occupy the space between the iron holder and the oven door, as clearly shown in Fig. 2.

I claim:

1. The combination of a sad iron and means for supporting said iron in an inverted or upturned position, and an oven adapted to contain the iron and holding means when not in use and having on its bottom a plurality of lugs adapted to interlock with the base of the iron to prevent the relative displacement of the iron and oven.

2. The combination of a sad iron and means for supporting said iron in an inverted or upturned position, and an oven adapted to contain the iron and holding means when not in use and having on its bottom a plurality of lugs adapted to interlock with the base of the iron to prevent the relative displacement of the iron and oven, and a removable grate contained within the oven and supported above the bottom of said oven.

3. The combination of a sad iron, a U-shaped holder for supporting the iron in an inverted position with its handle between the sides of said holder, a base plate for said holder, an oven adapted to contain the iron in inverted position in its holder when not in use and having a series of latches on its bottom disposed on a line conformed to the contour of the bottom of the iron and adapted to interlock with the bottom of the iron to hold the oven and iron against relative displacement, and a hinged door for said oven adapted to be normally maintained closed by gravity.

4. The combination of a sad iron having a heated bottom member, a body portion and a handle on the body portion, a support for the iron comprising a base plate formed to contact with the surface upon which the holder is placed along the edges only and a U-shaped portion open at its ends and top and fastened to said base plate and arranged to support the body of the iron along its upper edges with the handle of the iron disposed between the sides of said U-portion, and an oven having a hinged door as its front wall and adapted to contain the iron and its holder in their assembled relation when not in use, said oven having a plurality of under cut projections on its bottom disposed on a line conformed to the contour of the bottom member of the iron so as to interlock therewith to maintain the oven in place.

5. The combination of a sad iron having a heated bottom member, a body portion and a handle on the body portion, a support for the iron comprising a base plate formed to contact with the surface upon which the holder is placed along the edges only and a U-shaped portion open at its ends and top and fastened to said base plate and arranged to support the body of the iron along its upper edges with the handle of the iron disposed between the sides of said U-portion, an oven having a hinged door as its front wall and adapted to contain the iron and its holder in their assembled relation when not in use, said oven having a plurality of under cut projections on its bottom disposed on a line conformed to the contour of the bottom member of the iron so as to interlock therewith to maintain the oven in place, a tray adapted to fit within the bottom of the oven when in use and to fit in inverted position over the bottom of the iron when not in use, and a removable grate having supports arranged to maintain it spaced from the bottom of the oven when in use and being adapted to be positioned against the rear wall of the oven when the iron and holder are placed in said oven.

6. The combination of an elongated trough like member U-shaped in cross section and open at its ends, a base member supporting said trough member and formed to contact with the surface upon which the device is placed along its edges only, heat insulating means interposed between the trough like member and the base to prevent the radiation of heat from the trough member to the base, and a sad iron having a body portion and a handle adapted to be supported by said trough member with its body portion resting along the upper edges of said body portion and its handle disposed within said trough member.

7. The combination of an elongated trough like member U-shaped in cross section and open at its ends, a base member supporting said trough member and formed to contact with the surface upon which the device is placed along its edges only, heat insulating means interposed between the trough like member and the base to prevent the radiation of heat from the trough member to the base, a sad iron having a body portion and a handle adapted to be supported by said trough member with its body portion resting along the upper edges of said body portion and its handle disposed within said trough member, a receptacle adapted to maintain said iron and its holder when not in use, and having means for interlocking the base with the iron and adapted to serve as an oven when placed upon the inverted oven, and having means on its bottom for interlocking with the bottom of the iron to prevent the relative displacement of the receptacle and iron.

Signed by me at Chicago, Illinois, this 12 day of December, 1916.

JEREMIAH B. McLENE.

Witnesses:
E. H. CLEGG,
AMY JEHLE.